B. P. BRUNNER.
Rolls for Reducing Old Iron Railway Rails.

No. 209,743. Patented Nov. 5, 1878.

Witnesses
Geo. H. Strong.
Dwight T. Stacy

Inventor
B. P. Brunner
By his atty's
Dewey & Co.

UNITED STATES PATENT OFFICE.

BURROUGHS P. BRUNNER, OF SAN FRANCISCO, CALIFORNIA.

IMPROVEMENT IN ROLLS FOR REDUCING OLD IRON RAILWAY-RAILS.

Specification forming part of Letters Patent No. 209,743, dated November 5, 1878; application filed August 13, 1877.

*To all whom it may concern:*

Be it known that I, BURROUGHS P. BRUNNER, of the city of San Francisco, State of California, have invented certain Improvements in Machines for Rerolling Old Iron Railroad-Rails; and I hereby declare the following to be a full, clear, and exact description thereof, reference being had to the accompanying drawings, making part of this specification, in which—

Figure 1:
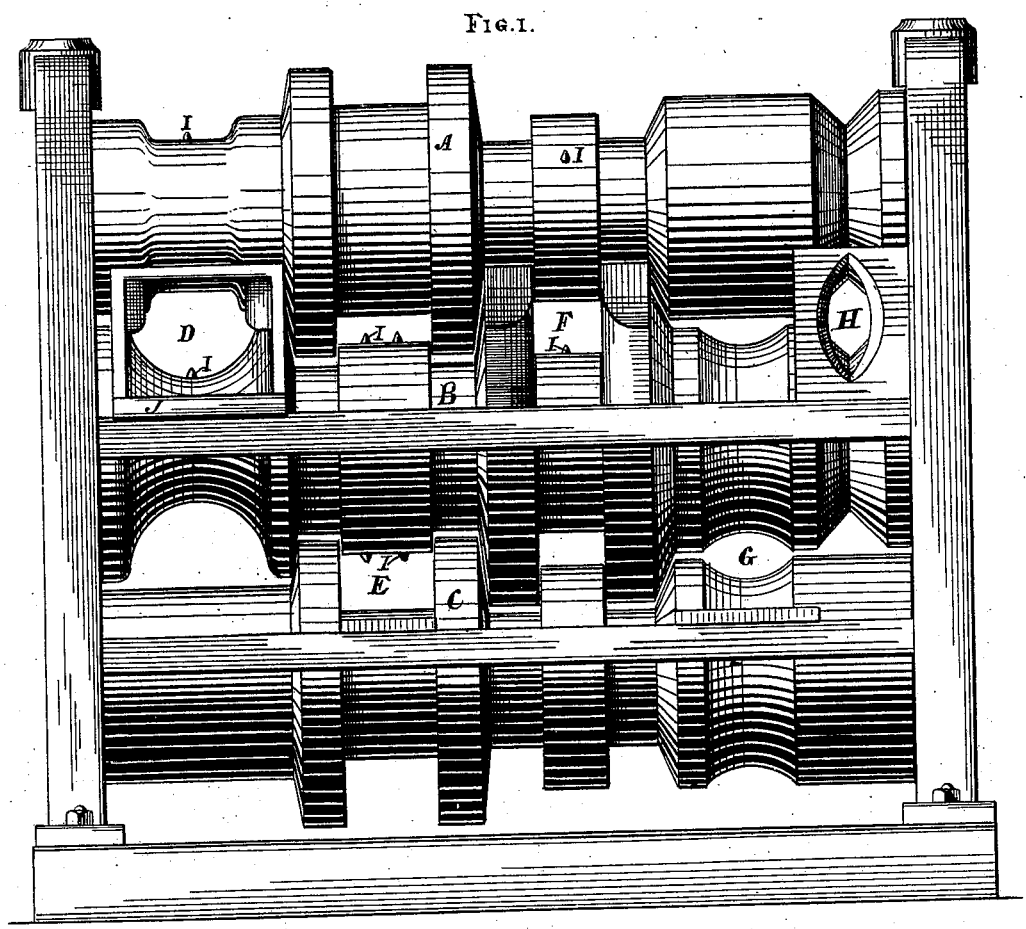
Figure 2:
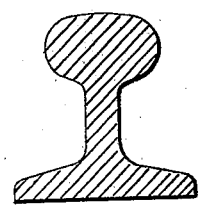
Figure 3:
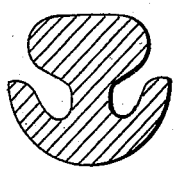
Figure 7:
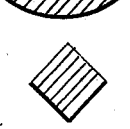
Figure 8:
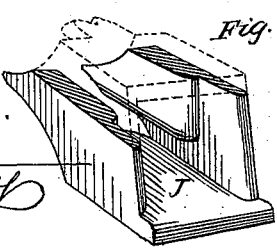

Figure 1 is a side elevation of the rolls for reducing the rails. Fig. 2 is a cross-sectional view of the rail, and Figs. 3, 4, 5, 6, and 7 are cross-sectional views of the products of the various passes. Fig. 8 is a view of the guide-box, having the top broken away.

Heretofore, in rerolling old iron rails, it has been necessary to reheat the rail after the reduction is started, before the rail is rolled into a billet, ready to be manipulated in the ordinary way, for the reason that the passes cannot be made so rapidly as to complete the reduction before the temperature is reduced below a welding heat, it being necessary to perfectly weld the flanges to the web of the rail.

The necessity for this turning up of the flanges of the rail and welding grows out of the fact that all iron rails contain two qualities of iron. The head and the flanges of the rail are made of a good quality of iron and the web is made of a very poor quality. In working up these rails it is desirable, if not absolutely necessary, to have the better quality of iron distributed equally around the outside of the bar. Hence the flanges are turned up and welded against the sides of the web in the early part of the operation, and then, as the bar is drawn out, the same distribution of the two qualities of the metal continues.

In all devices heretofore used to reduce these old rails the flanges have been bent up gradually by a series of passes through rolls, and during this series of passes the metal is cooling, so that it has to be reheated for the subsequent passes. This reheating and reworking is very expensive and largely enhances the cost of the product.

The turning up and welding of the flanges to the web has heretofore been impossible in two passes, for the reason that, should the flanges be suddenly bent up against the web by one or two passes, the torsion would twist and warp the rail out of all proper shape for manipulating it in the rolls, and many bars would be worthless.

Frequently the heads of these old rails, from wear or otherwise, have pieces broken away, and whenever this occurs the rail will fail to pass with sufficient rapidity through the rolls, as the rolls would fail to hold the rail, and would "slip," thereby losing some very essential time, necessary to rerolling the rail with such rapidity as to avoid reheating.

The object of my invention is to overcome the difficulties named and complete the rolling without reheating; and it consists in a series of rolls properly shaped, and provided with spurs to hurry the bar through the rolls, in combination with a guide having an irregularly-shaped interior.

In order that those skilled in the art may make and use my invention, I will proceed to describe the manner in which I have carried it out.

In the said drawings, A, B, and C are the rolls of a three-high reducing-mill. The first pass of the rail is through D, which brings the rail into the shape shown in Fig. 3. If no additional agency were brought to bear in this pass of the rail, it would twist and warp into such a shape as to be useless. To overcome this tendency to twist and warp, I place before the "pass" D a guide and holding-box, J, having such an irregular interior shape as will give the rail a number of bearing-points and hold it perfectly upright as it passes into the rolls.

The front of the box will always strip the workman's tongs from the rail, so that there is no danger of the tongs catching in the rollers.

Figure 4:
Figure 5:
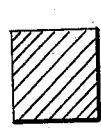
Figure 6:
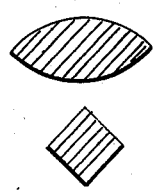

After the rail has passed through pass D it goes through pass E, where it is "edged up" and welded, as seen in Fig. 4. Then it goes to pass F, where it is squared, as seen in Fig. 5; thence to pass G, where it is drawn out in an oval cross-sectional form, and then, lastly, it is squared again in pass H, as seen in Fig. 7.

Owing to irregularities in the rails, produced by wear or otherwise, sometimes mere contact will fail to draw the rail through the rollers with sufficient rapidity, and to overcome this difficulty I provide on the rollers spurs I I, which seize the rail and hurry it through the rollers and prevent them from slipping.

I am aware of the existence of the patent to Verree and Mitchell, No. 65,968, and I lay no claim to what is therein described and claimed.

Having thus described my invention, what I claim as new, and desire to secure by Letters Patent, is—

The rolls A B C, provided with the passes D E F G H and spurs I, in combination with the holding-guide J, having the irregularly-shaped interior, as described.

In witness whereof I have hereunto set my hand and seal.

BURROUGHS P. BRUNNER. [L. S.]

Witnesses:
 FRANK A. BROOKS,
 O. T. STACY.